United States Patent
Yatsu (10) Patent No.: US 9,531,252 B2
(45) Date of Patent: Dec. 27, 2016

(54) SNUBBER CIRCUIT

(71) Applicant: SAMSUNG SDI CO., LTD., Yongin-si, Gyeonggi-do (KR)

(72) Inventor: Makoto Yatsu, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 0 days.

(21) Appl. No.: 14/825,404

(22) Filed: Aug. 13, 2015

(65) Prior Publication Data
US 2016/0094118 A1 Mar. 31, 2016

(30) Foreign Application Priority Data

Sep. 25, 2014 (JP) .................................. 2014-195335
May 14, 2015 (KR) ......................... 10-2015-0067484

(51) Int. Cl.
*H02M 1/34* (2007.01)
*H02M 7/5387* (2007.01)
*H02M 7/538* (2007.01)

(52) U.S. Cl.
CPC .............. *H02M 1/34* (2013.01); *H02M 7/538* (2013.01); *H02M 7/53871* (2013.01); *H02M 2001/344* (2013.01)

(58) Field of Classification Search
CPC .............. H02M 1/34; H02M 2001/342; H02M 2001/344; H02M 2001/346; H02M 2001/348; H02M 7/53; H02M 7/53862; H02M 7/5387
See application file for complete search history.

(56) References Cited

U.S. PATENT DOCUMENTS

| | | | | |
|---|---|---|---|---|
| 5,260,607 A * | 11/1993 | Kinbara | ................. | H02M 1/34 327/427 |
| 5,523,936 A * | 6/1996 | Leu | .................. | H02M 3/33538 323/282 |
| 6,226,192 B1 * | 5/2001 | Yamanaka | ............. | H02M 1/34 363/132 |
| 6,392,907 B1 * | 5/2002 | Ichikawa | ............. | H02M 7/487 363/132 |
| 6,597,590 B2 * | 7/2003 | Ikimi | ..................... | H02M 1/34 363/56.05 |

(Continued)

FOREIGN PATENT DOCUMENTS

| JP | 05-103481 A | 4/1993 |
|---|---|---|
| JP | 2004-080880 A | 3/2004 |

*Primary Examiner* — Gary L Laxton
(74) *Attorney, Agent, or Firm* — Lee & Morse, P.C.

(57) ABSTRACT

A snubber circuit includes a current-variation suppressor, a voltage-variation suppressor, a retrieving circuit, and a discharging circuit. The current-variation suppressor is connected between a bridge circuit and a power supply and reduces current variation when switches in the bridge circuit are controlled. The voltage-variation suppressor is parallel to the switches and reduces voltage variation when the switches are controlled. The retrieving circuit transfers energy stored in the current-variation suppressor when the switches are controlled to the voltage-variation suppressor. The discharging circuit discharges energy stored in the voltage-variation suppressor when the switches are controlled to an AC side of the bridge circuit when the semiconductor switches are controlled.

14 Claims, 6 Drawing Sheets

(56) References Cited

U.S. PATENT DOCUMENTS

| | | | | |
|---|---|---|---|---|
| 8,462,524 B2* | 6/2013 | Gekeler | ................ | H02M 7/487 363/135 |
| 2004/0174725 A1* | 9/2004 | Fujiyoshi | ............ | H02M 3/3382 363/56.01 |
| 2014/0232266 A1* | 8/2014 | Finley | ...................... | H05H 1/46 315/111.21 |
| 2014/0376286 A1* | 12/2014 | Hosokawa | .............. | H02M 1/34 363/56.08 |

* cited by examiner

SNUBBER CIRCUIT

CROSS-REFERENCE TO RELATED APPLICATIONS

Japanese Patent Application No. 2014-195335, filed on Sep. 25, 2014, and Korean Patent Application No. 10-2015-0067484, filed on May 14, 2015, entitled, "Snubber Circuit," are incorporated by reference herein in their entirety.

BACKGROUND

1. Field

One or more embodiments described herein relate to a snubber circuit.

2. Description of the Related Art

A variety of semiconductor bridge circuits have been developed. One type of semiconductor bridge circuit performs a soft switching operation using a snubber circuit. The snubber circuit attempts to prevent semiconductor switching elements from being broken by an abrupt increase in an input voltage or current.

SUMMARY

In accordance with one or more embodiments a snubber circuit includes a current-variation suppressor connected between a semiconductor bridge circuit and a DC power supply, the current-variation suppressor to reduce current variation when semiconductor switches in the semiconductor bridge circuit are controlled; a voltage-variation suppressor parallel to the semiconductor switches, the voltage-variation suppressor to reduce voltage variation when the semiconductor switches are controlled; a retrieving circuit to transfer energy stored in the current-variation suppressor when the semiconductor switches are controlled to the voltage-variation suppressor for a predetermined time when the semiconductor switches are controlled; and a discharging circuit to discharge energy stored in the voltage-variation suppressor when the semiconductor switches are controlled to an AC side of the semiconductor bridge circuit when the semiconductor switches are controlled.

The current-variation suppressor may reduce current variation when one or more of the semiconductor switches in the semiconductor bridge circuit are turned on; the voltage-variation suppressor may reduce voltage variation when the one or more semiconductor switches are turned off; the retrieving circuit may transfer energy stored in the current-variation suppressor when the one or more semiconductor switches are turned on to the voltage-variation suppressor for a predetermined time when the one or more semiconductor switches are turned off; and a discharging circuit may discharge energy stored in the voltage-variation suppressor when the one or more semiconductor switches are turned off to the AC side of the semiconductor bridge circuit when the one or more semiconductor switches turned on.

The semiconductor switches may include first and second switches connected to an output terminal. The current-variation suppressor may include a first reactor connected between a positive electrode of the DC power supply and a positive electrode of the semiconductor bridge circuit; the voltage-variation suppressor may include a first condenser with a first end connected to the positive electrode of the semiconductor bridge circuit, a second condenser with a first end connected to a negative electrode of the semiconductor bridge circuit, and a third condenser with a first end connected to an AC output terminal of the semiconductor bridge circuit; the retrieving circuit may include first and second diodes and a series-connected diode circuit, the first and second diodes connected between a second end of the first condenser and a second end of the second condenser, and in the series-connected diode circuit a second end of the third condenser is connected to a point where the first diode and the second diode are connected in series; and the discharging circuit may include a first LD serial circuit and a second LD serial circuit, the first LD serial circuit including a third diode and a third reactor connected between a first point and a negative electrode of the semiconductor bridge circuit, the first condenser and the series-connected diodes circuit connected at the first point, the second LD serial circuit including a fourth diode and a fourth reactor connected between a second point and the positive electrode of the semiconductor bridge circuit, the second condenser and the series-connected diodes circuit connected at the second point.

Each of the third reactor and the fourth reactor may include one iron core with two coils. The first reactor and the second reactor may be inductance components that are present across a distribution line between the DC power supply and the snubber circuit.

The current-variation suppressor may include a first reactor and a second reactor, the first reactor connected between a positive electrode of the DC power supply and a positive electrode of the semiconductor bridge circuit, and the second reactor connected between a negative electrode of the DC power supply and a negative electrode of the semiconductor bridge circuit; the voltage-variation suppressor may include a first condenser with a first end connected to the positive electrode of the semiconductor bridge circuit, a second condenser with a first end connected to the negative electrode of the semiconductor bridge circuit, and a third condenser with a first end connected to an AC output terminal of the semiconductor bridge circuit; the retrieving circuit may include first and second diodes and a series-connected diode circuit, the first and second diodes connected between a second end of the first condenser and a second end of the second condenser, and in the series-connected diode circuit a second end of the third condenser is connected to a first point where the first diode and the second diode are connected in series; and the discharging circuit may include a first LD serial circuit and a second LD serial circuit, the first LD serial circuit including a third diode and a third reactor connected between a second point and a negative electrode of the DC power supply, the first condenser and the series-connected diodes circuit connected at the second point, the second LD serial circuit including a fourth diode and a fourth reactor connected between a third point and a positive electrode of the DC power supply, the second condenser and the series-connected diodes circuit connected at the third point.

In accordance with one or more other embodiments, a snubber circuit includes a diode circuit; a first condenser; a second condenser; a third condenser; a first reactor connected between a power supply and a first switch; a second reactor connected between a first node a second node; and a third reactor connected between a third node and a fourth node, wherein the first node is between the first reactor and the first switch, the second node is between the second condenser and the third condenser, the third node is between the power supply and a second switch, and the fourth node is between the first condenser and the third condenser, wherein the diode circuit is connected between each of the first and second condensers and the third condenser, and wherein the first and second switches are included in a bridge circuit connected to an output terminal.

The first and second switches may be in a first configuration to reduce voltage variation at the output terminal, and wherein the third condenser is connected to the output terminal. The first and second switches may be in a second configuration to reduce current variation at an output terminal, and wherein the third condenser is connected to the output terminal. The third condenser may be connected between the diode circuit and the output terminal. The second and third reactors may be cross-coupled to the diode circuit. The second and third condensers may store energy stored in the first reactor. The diode circuit may be connected to the first and second condensers independent from connection of a resistor to the first and second condensers.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
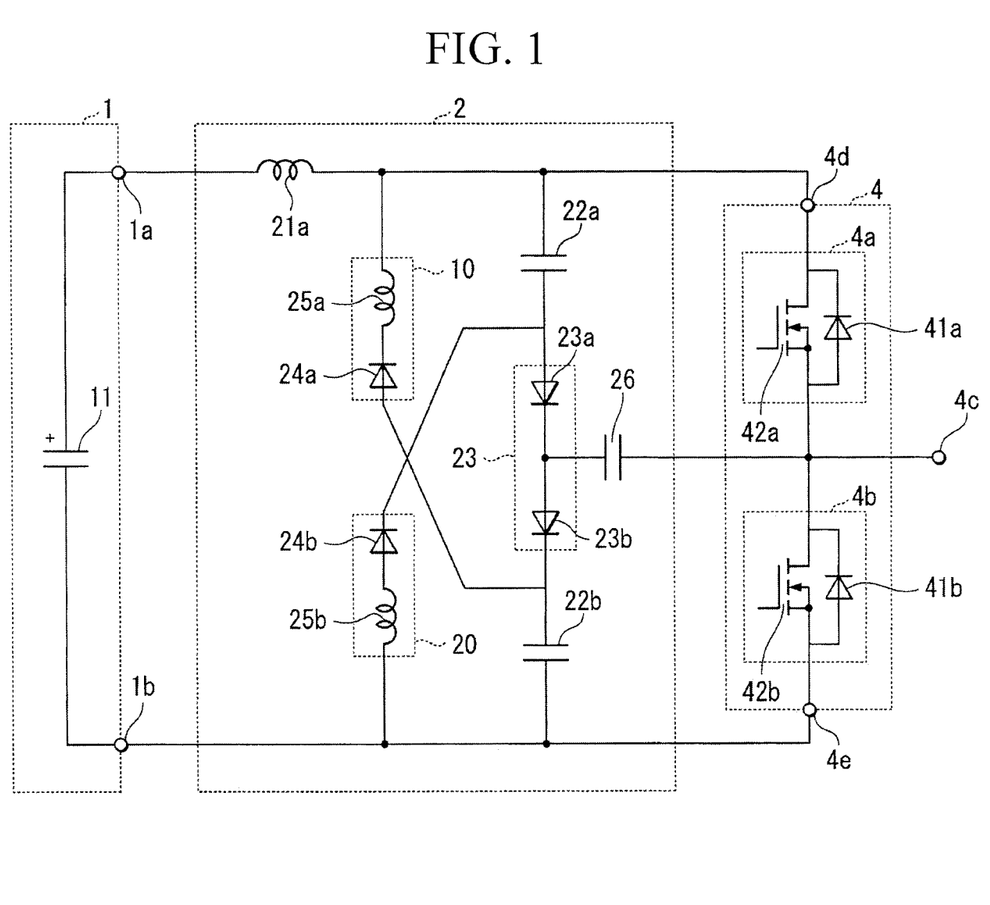
FIG. 1 illustrates an embodiment of a snubber circuit.

FIG. 1 illustrates an embodiment of a snubber circuit 2 connected in parallel between a power supply circuit 1 and a semiconductor bridge circuit 4. The snubber circuit 2 prevents the voltage or current of the semiconductor bridge circuit 4 from abruptly increasing to thereby allow a soft switching operation of the semiconductor bridge circuit 4 to be implemented.

The power supply circuit 1 includes a DC power supply 11, which, for example, may be a battery or a condenser. The condenser may be a capacitor.

The semiconductor bridge circuit 4 includes semiconductor switches 4a and 4b connected in series and an AC output terminal 4c. The AC output terminal 4c is connected at a point where the semiconductor switches 4a and 4b are serially connected, and the output terminal 4c may be connected to a load, e.g., an inductive load such as a motor or circuit. The semiconductor switch 4a or 4b are switched between ON and OFF states to provide power from the DC power supply 11 to the load connected to the AC output terminal 4c.

The semiconductor bridge circuit 4 performs a zero current switching (ZCS) operation via a reactor 21a of the snubber circuit 2 when turned on. The semiconductor bridge circuit 4 performs a zero voltage switching (ZVS) operation via a condenser 26 of the snubber circuit 2 when turned off.

The semiconductor switch 4a includes a switch element 42a connected in parallel to a diode 41a. The switch element 42a may be, for example, a bipolar transistor, a metal-oxide-semiconductor field-effect transistor (MOSFET), or an insulated gate bipolar transistor (IGBT). The semiconductor switch 4b includes a switch element 42b connected in parallel to a diode 41b. The switch element 42b may be, for example, a bipolar transistor, a MOSFET, or an IGBT. The semiconductor bridge circuit 4 has a positive electrode terminal 4d connected to the cathode of the diode 41a and a negative terminal 4e connected to the anode of the diode 41b.

The snubber circuit 2 includes the reactor 21a, a condenser 22a, a condenser 22b, a series-connected diode circuit 23, a condenser 26, an LD serial circuit 10, and an LD serial circuit 20. The condensers may be capacitors.

The reactor 21a is connected between the positive electrode terminal 1a of the DC power supply 11 and the positive electrode terminal 4d of the semiconductor bridge circuit 4. For example, one end of the reactor 21a is connected to the positive electrode terminal 1a of the DC power supply and the other end is connected to the positive electrode terminal 4d. The reactors disclosed herein may be inductors.

The condenser 22a is connected to the positive electrode terminal 4d of the semiconductor bridge circuit 4 and the other end of the reactor 21a. The other end of the condenser 22a is connected to one end of the series-connected diodes circuit 23.

One end of the condenser 22b is connected to the negative terminal 4e of the semiconductor bridge circuit 4. The other end of the condenser 22b is connected to the other end of the series-connected diodes circuit 23.

The series-connected diode circuit 23 includes a diode 23a connected to a diode 23b in series. The cathode of the diode 23a is connected to the anode of the diode 23b. The anode of the diode 23a is connected to the other end of the condenser 22a. The cathode of the diode 23b is connected to the other end of the condenser 22b.

The condenser 26 is connected between a point where the diodes 23a and 23b are serially connected and the AC output terminal 4c of the semiconductor bridge circuit 4. The condenser 26 suppresses a rapid voltage variation (dv/dt) of an output voltage of the AC output terminal 4c by discharging charge stored therein.

The LD serial circuit 10 includes a diode 24a and a reactor 25a. The diode 24a is connected in series to the reactor 25a. The anode of the diode 24a is connected to the cathode of the diode 23b. The cathode of the diode 24a is connected to one end of the reactor 25a. The other end of the reactor 25a is connected to the other end of the reactor 21a. When regenerating charges stored in the condenser 22b to the AC output terminal 4c via the LD serial circuit 10, the reactor 25a suppresses a rapid current variation (di/dt) when regenerating the charges.

The LD serial circuit 20 includes a diode 24b connected to a reactor 25b in series. The cathode of the diode 24b is connected to the anode of the diode 23a. The anode of the diode 24a is connected to one end of the reactor 25b. The other end of the reactor 25b is connected to the negative terminal 4e. When regenerating charges stored in the condenser 22a to the AC output terminal 4c via the LD serial circuit 20, the reactor 25b suppresses a rapid current variation (di/dt) when regenerating the charges.

An operation for turning off a semiconductor switch 4a after the semiconductor switch 4a has been in an ON-state and a semiconductor switch 4b has been in an OFF-state will now be described.

When the semiconductor switch 4a is in the ON-state and the semiconductor switch 4b is in the OFF-state, current from the DC power supply 11 (e.g., an output current) flows from the DC power supply 11 along a first path which includes the positive electrode terminal 1a of the DC power supply 11, the reactor 21a, and the semiconductor switch 4a, and is output through the AC output terminal 4c. The output current flowing through the AC output terminal 4c is output to a load.

Since the output current flows through the reactor 21a, energy is stored in the reactor 21a. Further, since the semiconductor switch 4a is in the ON-state, power is charged to the condenser 26.

After the semiconductor switch 4a is in the ON-state and the semiconductor switch 4b is in the OFF-state, the semiconductor switch 4a may be turned off. During a turn-off transition period, the output current is switched to a second path from the DC power supply 11. The second path includes the positive electrode terminal 1a of the DC power supply, the reactor 21a, the condenser 22a, the diode 23a, the condenser 26, and the AC output terminal 4c. Accordingly, energy stored in the reactor 21a is stored in the condenser 22a and the condenser 22b. This energy increases voltages of the condensers 22a and 22b.

The voltage of the AC output terminal 4c decreases when the semiconductor switch 4a is turned off. In this case, power stored in the condenser 26 is discharged. Accordingly, while a voltage variation (dv/dt) of a potential of the AC output terminal 4c is reduced or suppressed by discharge of the condenser 26, the potential decreases from the potential of the positive electrode of the semiconductor bridge circuit 4 to the potential of the negative electrode thereof. In other words, when the semiconductor switch 4a is turned off and as the condenser 26 is discharged, soft switching for reducing or suppressing a rapid voltage variation (dv/dt) of the potential of the AC output terminal 4c may be implemented by ZVS.

In addition, until the potential of the AC output terminal 4c drops from the potential of the positive electrode of the semiconductor bridge circuit 4 to the potential of the negative electrode thereof, the current flowing from the condenser 26 to the AC output terminal 4c is switched to the diode 23b, the condenser 22b, the semiconductor switch 4b, and the AC output terminal 4c.

Then, the output current flows from the DC power supply 11 along a third path which includes a negative terminal 1b of the DC power supply, the semiconductor switch 4b, and the AC output terminal 4c, and the switching operation associated with turning off the semiconductor switch 4a is completed.

An operation for turning on the semiconductor switch 4a after the semiconductor switches 4a and 4b have been in OFF-states will now be described.

When the semiconductor switch 4a is turned on again after being in the OFF-state, the output current from the AC output terminal 4c not only flows from the DC power supply 11 through the negative terminal 1b of the DC power supply, the semiconductor switch 4b, and the AC output terminal 4c, but also flows through three paths to be described below.

The first path of the three paths includes the reactor 25b, the diode 24b, the condenser 22a, and the semiconductor switch 4a. The first path is a path for regenerating the energy stored in the condenser 22a to the AC output terminal 4c when turning off the semiconductor switch 4a.

The second path of the three paths includes the condenser 22b, the diode 24a, the reactor 25a, and the semiconductor switch 4a. The second path is a path for regenerating the energy stored in the condenser 22b to the AC output terminal 4c when turning off the semiconductor switch 4a.

The third path of the three paths includes the DC power supply 11, the positive electrode terminal 1a of the DC power supply, the reactor 21a, and the semiconductor switch 4a.

When the semiconductor switch 4a is turned on, current flows through any one of the reactors 21a, 25a, and 25b. As a result, when the semiconductor switch 4a is turned on, a rapid current variation (di/dt) is reduced or suppressed and current gradually increases. On the other hand, the output current flowing through the semiconductor switch 4b decreases. After the semiconductor switch 4b has no current flowing therethrough and is then in the OFF-state, the condenser 26 is charged by the current flowing through the semiconductor switch 4a.

Accordingly, a rapid voltage variation (dv/dt) of the AC output terminal 4c, e.g., from a potential of the negative electrode of the semiconductor bridge circuit 4 to a potential of the positive electrode, is reduced or suppressed and thus voltage gradually increases. Thus, when the semiconductor switch 4a is turned on, soft switching for suppressing a rapid current variation (di/dt) of the current when turning on the semiconductor switch 4a may be implemented by ZCS.

Finally, all output current flows through a path which includes the DC power supply 11, the reactor 21a, the semiconductor switch 4a, and the AC output terminal 4c, and the switching operation associated with the operation of turning on the semiconductor switch 4a is completed.

The switched energy of the reactor 21a, which is stored in the condenser 22a and the condenser 22b and which increases a voltage of the condenser at the previous turn-off operation, is output to an output side according to the output current at the current turn-on operation. As a result, the switched energy of the reactor 21a is regenerated at the output side without causing a loss of electrical energy in the snubber circuit 2.

In addition, in a reverse regenerative operation of the diode 41b of the semiconductor switch 4b associated with turning on the semiconductor switch 4a, since suppression of the current variation (di/dt) and suppression of the voltage variation (dv/dt) are implemented, soft switching may be implemented. On the other hand, in the operations of turning the semiconductor switch 4b on and off where the output current flows in opposite directions, the same effect may be achieved by symmetry of the circuit.

As described above, the snubber circuit 2 of the present embodiment includes the reactor 21a, which is a current variation (di/dt) suppressor, between the semiconductor bridge circuit 4 and the DC power supply 11. In addition, the snubber circuit 2 includes the condensers 22a, 22b, and 26, which are rapid voltage variation (dv/dt)-suppressors connected in parallel to the semiconductor switch.

Accordingly, the energy stored in the current variation (di/dt)-suppressor may be retrieved, when turning off the semiconductor bridge circuit 4, to the rapid voltage variation (dv/dt)-suppressor for a predetermined time. In addition, the energy stored in the rapid voltage variation (dv/dt)-suppressor may be discharged, when turning on the semiconductor bridge circuit 4, to the AC side of the semiconductor bridge circuit 4 without using a resistive element or a semiconductor element (switch).

Accordingly, electrical energy loss may be prevented and the number of parts may be reduced, thereby contributing to reduced size, lower price, and low-loss trends. In addition, since the soft switching operation reduces EMI noise emitted from the snubber circuit 2, an EMI countermeasure may be easily performed.

Figure 2:
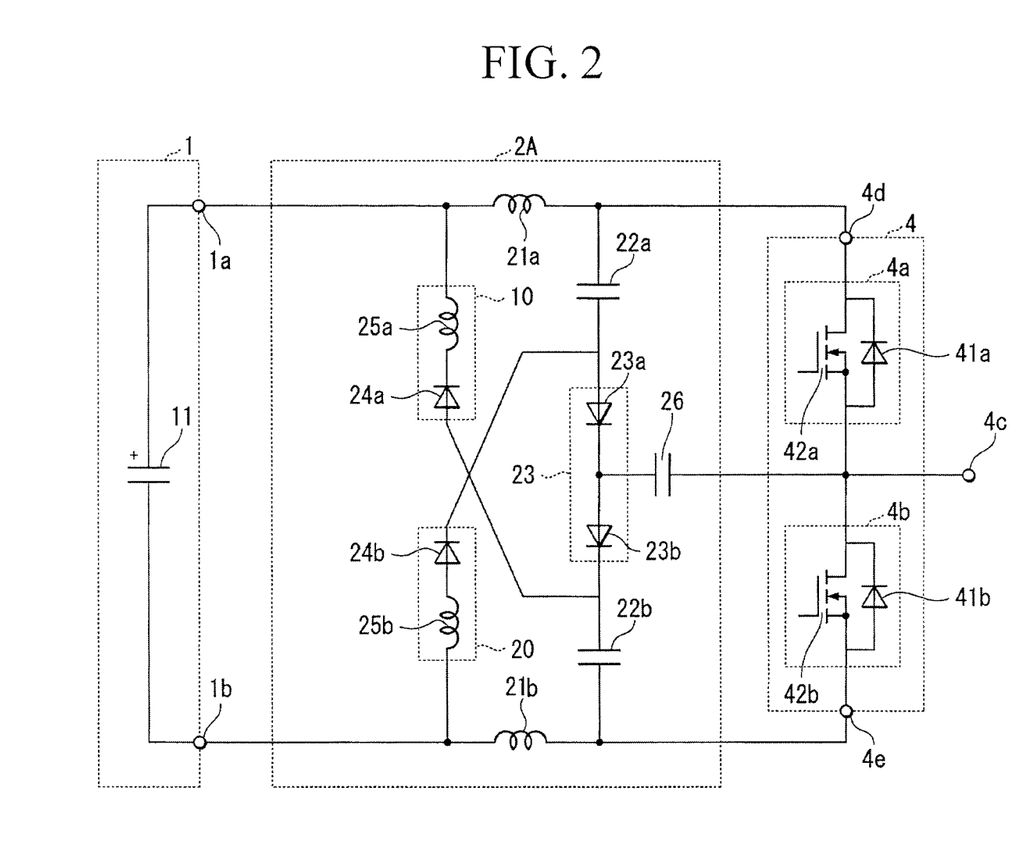
FIG. 2 illustrates another embodiment of a snubber circuit.

FIG. 2 illustrates a snubber circuit 2A in accordance with a second embodiment which additionally includes a reactor 21b. Further, the snubber circuit 2A has a configuration in which the reactor 25a and the reactor 25b are respectively connected to the positive electrode terminal 1a and the negative terminal 1b of DC power supply 11.

The snubber circuit 2A is connected in parallel between the DC power supply 11 and the semiconductor bridge circuit 4. The snubber circuit 2A prevents a voltage and/or current of the semiconductor bridge circuit 4 from abruptly increasing, to thereby implement a soft switching operation of the semiconductor bridge circuit 4.

Referring to FIG. 2, the snubber circuit 2A includes a reactor 21a, a reactor 21b, a condenser 22a, a condenser 22b, a series-connected diodes circuit 23, a condenser 26, an LD serial circuit 10, and an LD serial circuit 20. The reactor 21a is connected between the positive electrode terminal 1a of the DC power supply 11 and the positive electrode terminal 4d of the semiconductor bridge circuit 4. In addition, the reactor 21a is connected between one end of the condenser 22a and the LD serial circuit 10.

The reactor 21b is connected between the negative terminal 1b of the DC power supply 11 and the negative terminal 4e of the semiconductor bridge circuit 4. For example, one end of the reactor 21b is connected to the LD serial circuit 20, and the other end of the reactor 21b is connected to one end of the condenser 22b.

The LD serial circuit 10 includes a diode 24a connected to a reactor 25a in series. The anode of the diode 24a is connected to the cathode of the diode 23b, and the cathode of the diode 24a is connected to one end of the reactor 25a. The other end of the reactor 25a is connected to one end of the reactor 21a.

The LD serial circuit 20 includes a diode 24b connected to a reactor 25b in series. The cathode of the diode 24b is connected to the anode of the diode 23a, and the anode of the diode 24a is connected to one end of the reactor 25b. The other end of the reactor 25a is connected to one end of the reactor 21b.

An operation of the snubber circuit 2A for turning off the semiconductor switch 4a, when a semiconductor switch 4a is in an ON-state and a semiconductor switch 4b is in an OFF-state, will now be described When the semiconductor switch 4a is in the ON-state and the semiconductor switch 4b is in the OFF-state, the output current from the DC power supply 11 flows through a path which includes the positive electrode terminal 1a of the DC power supply, the reactor 21a, the semiconductor switch 4a, and the AC output terminal 4c. The output current passes through the AC output terminal 4c and is provided to a load. Since the output current flows through the reactor 21a, energy is stored in the reactor 21a. In addition, since the semiconductor switch 4a is in the ON-state, power is charged to the condenser 26.

After the semiconductor switch 4a has been in the ON-state and the semiconductor switch 4b has been in the OFF-state, the semiconductor switch 4a is turned off. During a turn-off transition period, the output current is switched to a path which includes the DC power supply 11, the positive electrode terminal 1a of the DC power supply, the reactor 21a, the condenser 22a, the diode 23a, the condenser 26, and the AC output terminal 4c. Accordingly, energy stored in the reactor 21a is stored in the condensers 22a and 22b. The stored energy increases the voltages of the condensers 22a and 22b.

The voltage of the AC output terminal 4c decreases when semiconductor switch 4a is turned off. As a result, power stored in condenser 26 is discharged. Accordingly, a rapid voltage variation (dv/dt) is suppressed by the discharge of the condenser 26. Thus, the potential of the AC output terminal 4c decreases from a potential of the positive electrode of the semiconductor bridge circuit 4 to a potential of the negative electrode thereof. For example, when the semiconductor switch 4a is turned off and as the condenser 26 is discharged, soft switching for suppressing a rapid voltage variation (dv/dt) of the potential of the AC output terminal 4c may be implemented by ZVS.

In addition, until the potential of the AC output terminal 4c drops from the potential of the positive electrode of the semiconductor bridge circuit 4 to the potential of the negative electrode thereof, the output current from the condenser 26 to the AC output terminal 4c is switched to a path which includes the diode 23b, the condenser 22b, the semiconductor switch 4b, and the AC output terminal 4c.

Then, the output current from the DC power supply 11 flows through a path which includes the negative terminal 1b of the DC power supply, the reactor 21b, and the semiconductor switch 4b, and the AC output terminal 4c, and the switching operation associated with the operation of turning off the semiconductor switch 4a is completed.

Next, operation of the snubber circuit 2A of the present embodiment for turning on the semiconductor switch 4a after the semiconductor switch 4a and the semiconductor switch 4b are in the OFF-states will be described.

After the semiconductor switches 4a and 4b have been in the OFF-state, the semiconductor switch 4a is turned on. As a result, the output current not only flows through the aforementioned path of the DC power supply 11, the negative terminal 1b of the DC power supply, the reactor 21b, the semiconductor switch 4b, and the AC output terminal 4c, but also through three paths to be described below.

The first path includes the reactor 25b, the diode 24b, the condenser 22a, and the semiconductor switch 4a. The first path is provided for regenerating the energy stored in the condenser 22a to the AC output terminal 4c when the semiconductor switch 4a is turned off.

The second path includes the condenser 22b, the diode 24a, the reactor 25a, and the semiconductor switch 4a. The second path is provided for regenerating the energy stored in the condenser 22b to the AC output terminal 4c when the semiconductor switch 4a is turned off.

The third path includes the DC power supply 11, the positive electrode terminal 1a of the DC power supply, the reactor 21a, and the semiconductor switch 4a.

When the semiconductor switch 4a is turned on, a current flows through any one of the reactor 21a, the reactor 21b, the reactor 25a, and the reactor 25b. Accordingly, when the semiconductor switch 4a is turned on, current increases but a rapid current variation (di/dt) is suppressed. On the other hand, the output current flowing through the semiconductor switch 4b gradually decreases.

After the semiconductor switch 4b has no current flowing therethrough and is then in the OFF-state, the condenser 26 is charged by the current flowing through the semiconductor switch 4a. Accordingly, a rapid voltage variation (dv/dt) of a potential of the AC output terminal 4c is suppressed, from a potential of the negative electrode of the semiconductor bridge circuit 4 to a potential of the positive electrode, and gradually increases. Thus, when the semiconductor switch 4a is turned on, soft switching for suppressing a current variation (di/dt) of a turn-on current may be realized by ZCS.

Then, all output current flows through from the DC power supply 11 through a path which includes the reactor 21a, the semiconductor switch 4a, and the AC output terminal 4c, and the switching operation associated with the operation of turning off the semiconductor switch 4a is completed.

As such, the switched energy of the reactor 21, which is stored in the condenser 22a and the condenser 22b and which increases a voltage of the condenser at the previous turn-off operation, is output to an output side in accordance with the output current at the current turn-on operation. Thus, the current energy of the reactor 21 is regenerated at the output side without causing a loss of the snubber circuit 2A.

In addition, in a reverse regenerative operation of the diode 41b of the semiconductor switch 4b associated with turning on the semiconductor switch 4a, suppression of the current variation (di/dt) and suppression of the voltage variation (dv/dt) are implemented and thus soft switching may be performed. On the other hand, in the operations of turning the semiconductor switch 4b on and off where the output current flows in opposite directions, the same effect may be achieved by symmetry of the circuit.

As described above, the snubber circuit 2A of the present embodiment includes the reactors 21a and 21b, which operate as a current variation (di/dt) suppressors, between the semiconductor bridge circuit 4 and the DC power supply 11. In addition, the snubber circuit 2 includes the condensers 22a, 22b, and 26, which operate as rapid voltage variation (dv/dt) suppressors, are connected in parallel to the semiconductor switch. Thus, for example, the same or similar effect as that of the previous embodiment may be achieved.

Figure 3:
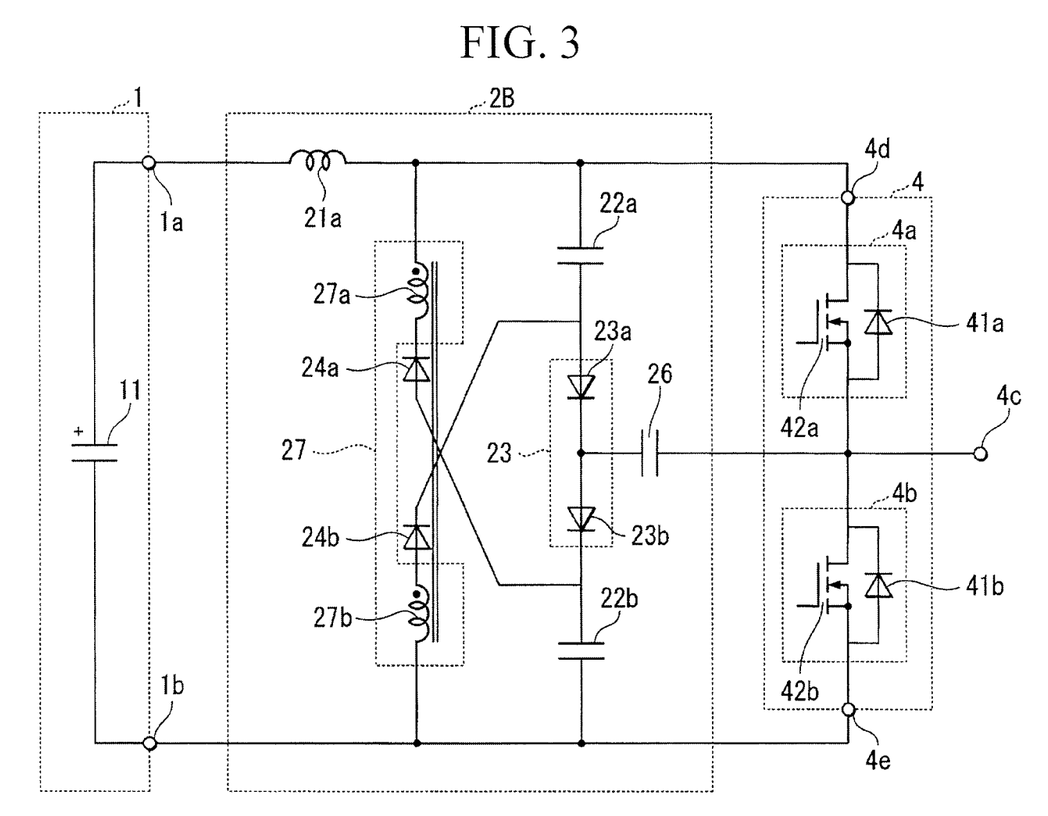
FIG. 3 illustrates another embodiment of a snubber circuit.

FIG. 3 illustrates another embodiment of a snubber circuit 2B in which the reactor 25a and the reactor 25b are replaced by one reactor 27 including two coils (reactors 27a and 27b). The snubber circuit 2B is connected in parallel between the DC power supply 11 and the semiconductor bridge circuit 4. The snubber circuit 2B prevents the voltage and/or current of the semiconductor bridge circuit 4 from abruptly increasing, to thereby implement a soft switching operation of the semiconductor bridge circuit 4.

Referring to FIG. 3, the snubber circuit 2B includes a reactor 21a, a condenser 22a, a condenser 22b, a series-connected diodes circuit 23, a condenser 26, a reactor 27, a diode 24a, and a diode 24b. The reactor 27 includes a reactor 27a and a reactor 27b. The reactor 27 is a reactor that shares iron cores of the reactor 27a and the reactor 27b.

The diode 24a is connected to the reactor 25a in series. The anode of the diode 24a is connected to the cathode of the diode 23b. The cathode of the diode 24a is connected to one end of the reactor 27a. The other end of the reactor 27a is connected to the other end of the reactor 21a. The reactor 27a regenerates charges stored in the condenser 22b via the diode 24a and the reactor 27a to the AC output terminal 4c, so a rapid current variation (di/dt) may be suppressed when regenerating the charges.

The diode 24b is connected to the reactor 27b in series. The cathode of the diode 24b is connected to the anode of the diode 23a. The anode of the diode 24a is connected to one end of the reactor 27b. The other end of the reactor 27b is connected to the negative terminal 4e. The reactor 27b suppresses the rapid current variation (di/dt) when regenerating the charges stored in the condenser 22a to the AC output terminal 4c via the diode 24b and the reactor 27b. Operation of the snubber circuit 2B of the present embodiment may be the same as previous embodiments.

In the snubber circuit 2B of the present embodiment, the reactor 21a is included as a current variation (di/dt) suppressor between the semiconductor bridge circuit 4 and the DC power supply 11. In addition, condensers 22a, 22b, and 26 are included as rapid voltage variation (dv/dt) suppressors in parallel with the semiconductor switch. Accordingly, the same or similar effect as previous embodiments may be achieved.

In addition, the snubber circuit 2B of the present embodiment has a different configuration from previous embodiments in that the reactor 25a and the reactor 25b are replaced by one reactor 27 including two coils (reactors 27a and 27b). Accordingly, the snubber circuit 2B may smaller and cheaper to make.

Figure 4:
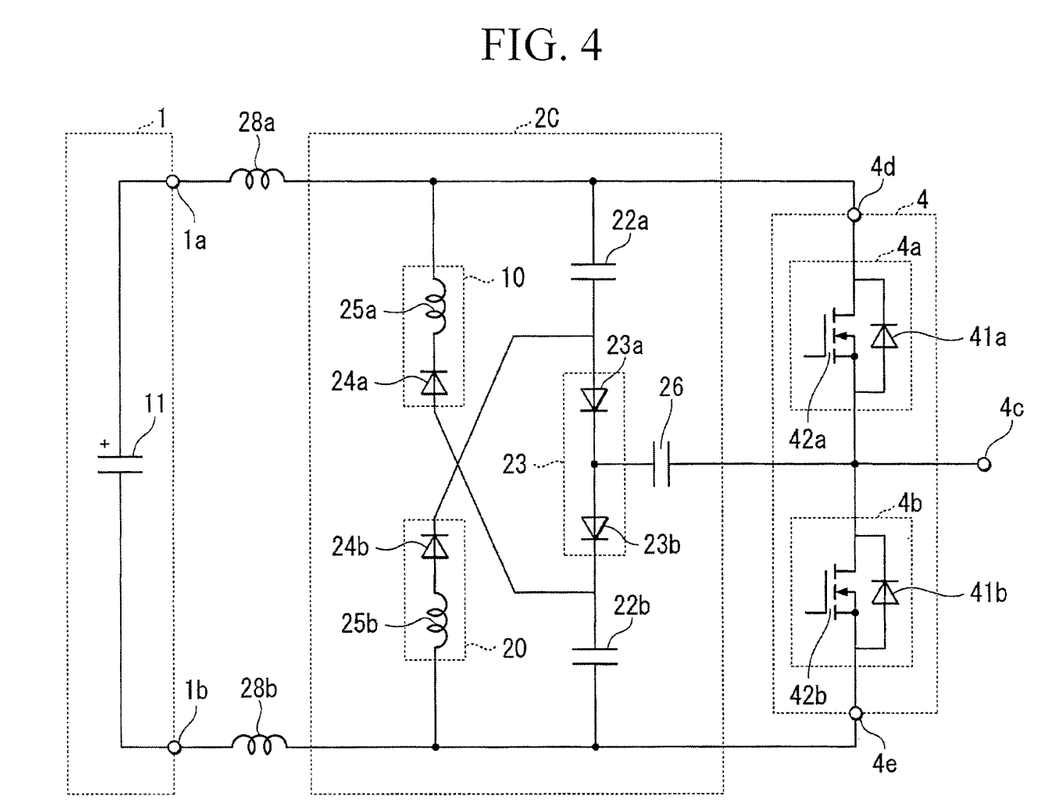
FIG. 4 illustrates another embodiment of a snubber circuit.

FIG. 4 illustrates another embodiment of a snubber circuit 2C in which the reactor 21a of previous embodiments is omitted. The snubber circuit 2C may use stray inductance components 28a and 28b present over a distribution line as components. In order to adjust the stray inductance components 28a and 28b, the semiconductor bridge circuit 4 and the snubber circuit 2C may be disposed to be in proximity to each other. In addition, the snubber circuit 2C and the DC power supply 11 may be wired to be further away from each other.

Referring to FIG. 4, the snubber circuit 2C includes a stray inductance component 28a, a stray inductance component 28b, a condenser 22a, a condenser 22b, a series-connected diodes circuit 23, a condenser 26, an LD serial circuit 10, and an LD serial circuit 20. The stray inductance component 28a is connected between the positive electrode terminal 1a of the DC power supply 11 and the positive electrode terminal 4d of the semiconductor bridge circuit 4. For example, one end of the stray inductance component 28a is connected to the positive electrode terminal 1a of the DC power supply 11. The other end of the stray inductance component 28a is connected to the positive electrode terminal 4d.

The stray inductance component 28b is connected between the negative terminal 1b of the DC power supply 11 and the negative terminal 4e of the semiconductor bridge circuit 4. For example, one end of the stray inductance component 28b is connected to the negative terminal 1b of the DC power supply 11. The other end of the stray inductance component 28b is connected to the negative terminal 4e. One end of the condenser 22a is connected to the positive electrode terminal 4d of the semiconductor bridge circuit 4 and the other end of the stray inductance component 28a. The other end of the condenser 22a is connected to one end of the series-connected diodes circuit 23.

One end of the condenser 22b is connected to the negative terminal 4e of the semiconductor bridge circuit 4 and the other end of the stray inductance component 28b. The other end of the condenser 22b is connected to the other end of the series-connected diodes circuit 23. The other end of the reactor 25a is connected to the other end of the stray inductance component 28a. The other end of the reactor 25b is connected to the other end of the stray inductance component 28b. Operation of the snubber circuit 2C of the present embodiment may be as one or more previous embodiments.

As described above, in the snubber circuit 2C of the present embodiment, the stray inductance components 28a and 28b that are present as current variation (di/dt) suppressors are used as components. In addition, condensers 22a, 22b, and 26 are included as rapid voltage variation (dv/dt) suppressors in parallel with the semiconductor switch. Accordingly, same or similar effects as previous embodiments may be achieved.

By way of summation and review, a variety of semiconductor bridge circuits have been developed. One type of semiconductor bridge circuit performs a soft switching operation using a snubber circuit. The snubber circuit attempts to prevent semiconductor switching elements from being broken by an abrupt increase in an input voltage or current.

Figure 5:
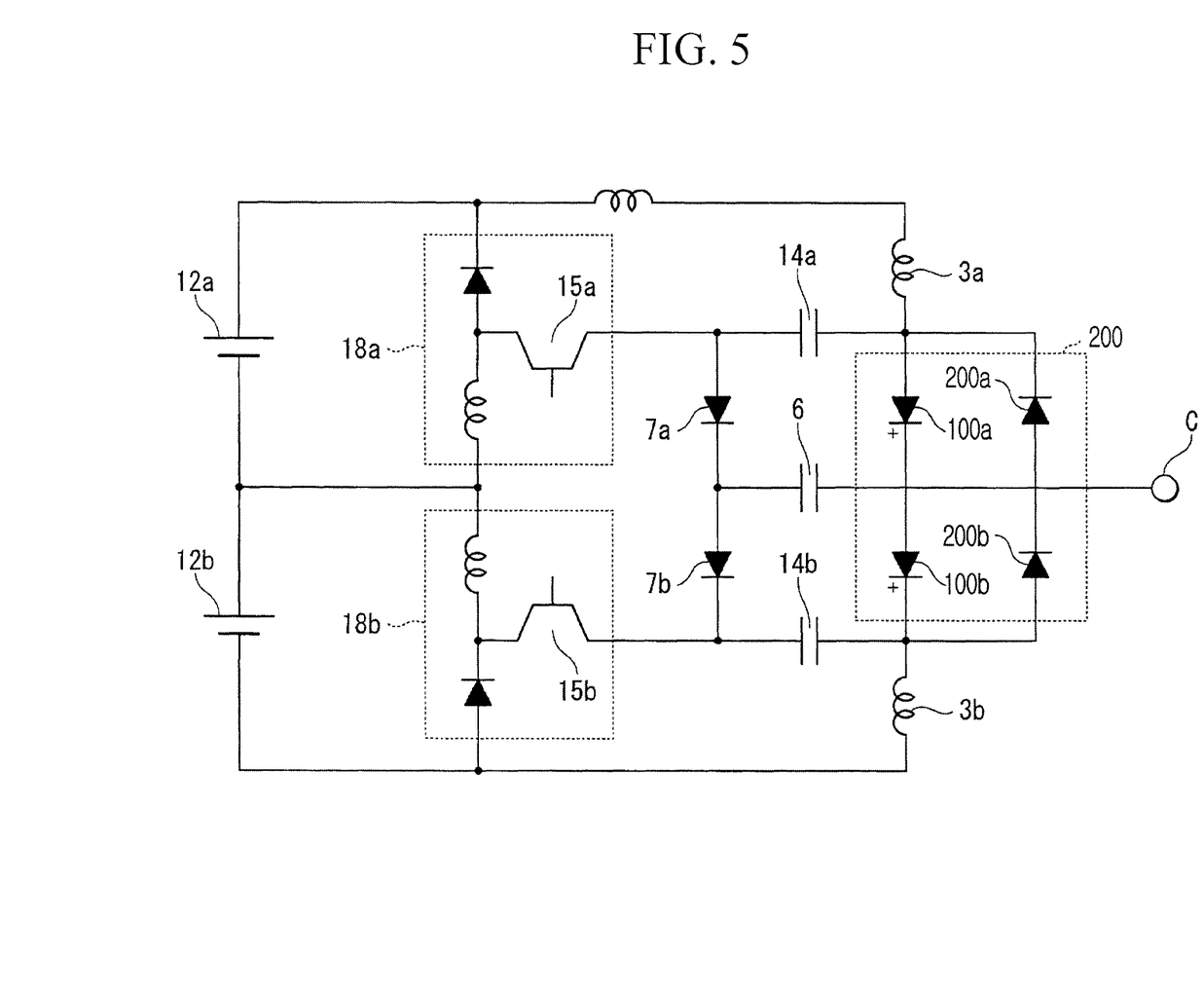
FIG. 5 illustrates another type of snubber circuit.

One type of snubber circuit, in FIG. 5, includes reactors 3a and 3b, condensers 14a and 14b, a condenser 6, diodes 7a and 7b, and chopper circuits 18a and 18b. A semiconductor bridge circuit 200 includes gate turn-off (GTO) thyristors 100a and 100b and diodes 200a and 200b. When the GTO thyristor 100a or 100b is turned on, the reactors 3a and 3b suppress a rapid current variation (di/dt) of an output terminal C of a semiconductor bridge circuit 200. Accordingly, the semiconductor bridge circuit 200 performs a zero current switching (ZCS) operation.

In addition, when the GTO thyristor 100a or 100b is turned off, the condensers 14a, 14b, and 6 suppress a rapid voltage variation (dv/dt) of the output terminal C of the semiconductor bridge circuit 200. Accordingly, the semiconductor bridge circuit 200 performs a zero voltage switching (ZVS) operation.

While performing the ZCS and ZVS operations, energy stored in the condensers 14a and 14b is regenerated to DC power supplies 12a and 12b via chopper circuits 18a and 18b including auxiliary switches 15a and 15b.

Figure 6:
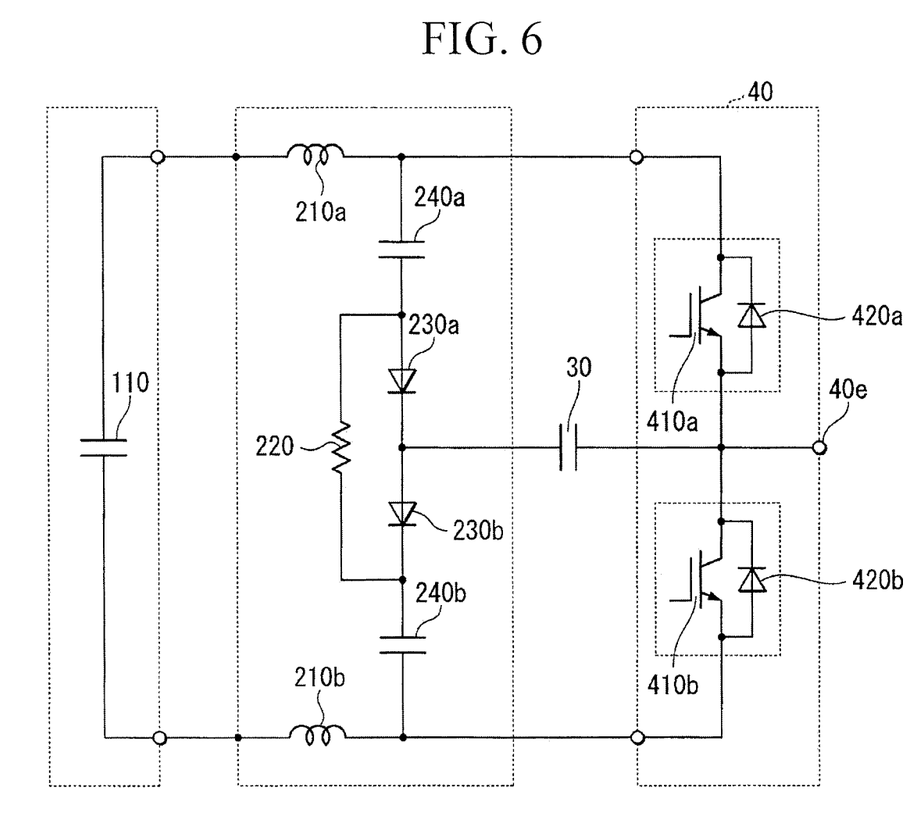
FIG. 6 illustrates another type of snubber circuit.

Another type of snubber, in FIG. 6, includes reactors 210a and 210b, condensers 240a and 240b, a condenser 30, diodes 230a and 230b, and a resistor 220. A semiconductor bridge circuit 40 includes insulated gate bipolar transistors (IGBTs) 410a and 410b and diodes 420a and 420b. When the IGBT 410a or 410b is turned on, the reactors 210a and 210b suppress a rapid current variation (di/dt) of an AC output terminal 40e of the semiconductor bridge circuit 40. Accordingly, the semiconductor bridge circuit 40 performs a ZVS operation.

In addition, when the IGBT 410a or 410b is turned off, the condensers 240a, 240b, and 30 suppress a rapid voltage variation (dv/dt) of the AC output terminal 40e of the semiconductor bridge circuit 40. Accordingly, the semiconductor bridge circuit 40 performs a ZVS operation.

While performing a series of the ZCS and ZVS operations, energy stored in the condensers 240a and 240b is regenerated to a DC power supply 110 via the resistor 220.

However, the snubber circuits in FIGS. 5 and 6 require an auxiliary switch controlled by an external control command in order to regenerate energy stored in the condenser of the snubber circuit to the DC power supply. Accordingly, the circuit and system configurations of the snubber circuits in FIGS. 5 and 6 are complex and costly to implement. In addition, the snubber circuit in FIG. 6 uses a resistor to regenerate the energy stored in the condenser of the snubber circuit to the DC power supply. The resistor may cause losses.

In accordance with one or more embodiments, a snubber circuit reduces or minimizes losses and has a simple configuration which may be less costly to implement.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A snubber circuit, comprising:
   a current-variation suppressor connected between a semiconductor bridge circuit and a DC power supply, the current-variation suppressor to reduce current variation when semiconductor switches in the semiconductor bridge circuit are controlled;
   a voltage-variation suppressor parallel to the semiconductor switches, the voltage-variation suppressor to reduce voltage variation when the semiconductor switches are controlled;
   a retrieving circuit to transfer energy stored in the current-variation suppressor when the semiconductor switches are controlled to the voltage-variation suppressor for a predetermined time when the semiconductor switches are controlled; and
   a discharging circuit to discharge energy stored in the voltage-variation suppressor when the semiconductor switches are controlled to an AC side of the semiconductor bridge circuit when the semiconductor switches are controlled.

2. The snubber circuit as claimed in claim 1, wherein:
   the current-variation suppressor is to reduce current variation when one or more of the semiconductor switches in the semiconductor bridge circuit are turned on;
   the voltage-variation suppressor is to reduce voltage variation when the one or more semiconductor switches are turned off;
   the retrieving circuit to transfer energy stored in the current-variation suppressor when the one or more semiconductor switches are turned on to the voltage-variation suppressor for a predetermined time when the one or more semiconductor switches are turned off; and
   a discharging circuit to discharge energy stored in the voltage-variation suppressor when the one or more semiconductor switches are turned off to the AC side of the semiconductor bridge circuit when the one or more semiconductor switches turned on.

3. The snubber circuit as claimed in claim 2, wherein the one or more semiconductor switches include first and second switches connected to an output terminal.

4. The snubber circuit as claimed in claim 1, wherein:
   the current-variation suppressor includes a first reactor connected between a positive electrode of the DC power supply and a positive electrode of the semiconductor bridge circuit;
   the voltage-variation suppressor includes a first condenser with a first end connected to the positive electrode of the semiconductor bridge circuit, a second condenser with a first end connected to a negative electrode of the semiconductor bridge circuit, and a third condenser with a first end connected to an AC output terminal of the semiconductor bridge circuit;

the retrieving circuit includes first and second diodes and a series-connected diode circuit, the first and second diodes connected between a second end of the first condenser and a second end of the second condenser, and in the series-connected diode circuit a second end of the third condenser is connected to a point where the first diode and the second diode are connected in series; and the discharging circuit includes a first LD serial circuit and a second LD serial circuit, the first LD serial circuit including a third diode and a third reactor connected between a first point and a negative electrode of the semiconductor bridge circuit, the first condenser and the series-connected diodes circuit connected at the first point, the second LD serial circuit including a fourth diode and a fourth reactor connected between a second point and the positive electrode of the semiconductor bridge circuit, the second condenser and the series-connected diodes circuit connected at the second point.

5. The snubber circuit as claimed in claim 4, wherein each of the third reactor and the fourth reactor includes one iron core with two coils.

6. The snubber circuit as claimed in claim 4, wherein the first reactor and the second reactor are inductance components that are present across a distribution line between the DC power supply and the snubber circuit.

7. The snubber circuit as claimed in claim 1, wherein:
the current-variation suppressor includes a first reactor and a second reactor, the first reactor connected between a positive electrode of the DC power supply and a positive electrode of the semiconductor bridge circuit, and the second reactor connected between a negative electrode of the DC power supply and a negative electrode of the semiconductor bridge circuit;

the voltage-variation suppressor includes a first condenser with a first end connected to the positive electrode of the semiconductor bridge circuit, a second condenser with a first end connected to the negative electrode of the semiconductor bridge circuit, and a third condenser with a first end connected to an AC output terminal of the semiconductor bridge circuit;

the retrieving circuit includes first and second diodes and a series-connected diode circuit, the first and second diodes connected between a second end of the first condenser and a second end of the second condenser, and in the series-connected diode circuit a second end of the third condenser is connected to a first point where the first diode and the second diode are connected in series; and the discharging circuit includes a first LD serial circuit and a second LD serial circuit, the first LD serial circuit including a third diode and a third reactor connected between a second point and a negative electrode of the DC power supply, the first condenser and the series-connected diodes circuit connected at the second point, the second LD serial circuit including a fourth diode and a fourth reactor connected between a third point and a positive electrode of the DC power supply, the second condenser and the series-connected diodes circuit connected at the third point.

8. A snubber circuit, comprising:
a diode circuit;
a first condenser;
a second condenser;
a third condenser;
a first reactor connected between a power supply and a first switch;
a second reactor connected between a first node a second node; and
a third reactor connected between a third node and a fourth node,
wherein the first node is between the first reactor and the first switch, the second node is between the second condenser and the third condenser, the third node is between the power supply and a second switch, and the fourth node is between the first condenser and the third condenser, wherein the diode circuit is connected between each of the first and second condensers and the third condenser, and wherein the first and second switches are included in a bridge circuit connected to an output terminal.

9. The snubber circuit as claimed in claim 8, wherein the first and second switches are in a first configuration to reduce voltage variation at the output terminal, and wherein the third condenser is connected to the output terminal.

10. The snubber circuit as claimed in claim 8, wherein the first and second switches are in a second configuration to reduce current variation at an output terminal, and wherein the third condenser is connected to the output terminal.

11. The snubber circuit as claimed in claim 8, wherein the third condenser is connected between the diode circuit and the output terminal.

12. The snubber circuit as claimed in claim 8, wherein the second and third reactors are cross-coupled to the diode circuit.

13. The snubber circuit as claimed in claim 8, wherein the second and third condensers are to store energy stored in the first reactor.

14. The snubber circuit as claimed in claim 8, wherein the diode circuit is connected to the first and second condensers independent from connection of a resistor to the first and second condensers.

* * * * *